United States Patent
Yamamoto et al.

(10) Patent No.: US 11,078,966 B2
(45) Date of Patent: Aug. 3, 2021

(54) CLUTCH FRICTION PLATE AND CLUTCH DEVICE

(71) Applicant: Kabushiki Kaisha F.C.C., Shizuoka (JP)

(72) Inventors: Shingo Yamamoto, Shizuoka (JP); Yoshihiko Ozawa, Shizuoka (JP); Kazuma Matsushita, Shizuoka (JP); Hiroki Hara, Shizuoka (JP); Hiroyuki Ijima, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/500,410

(22) PCT Filed: Mar. 7, 2018

(86) PCT No.: PCT/JP2018/008808
§ 371 (c)(1),
(2) Date: Oct. 3, 2019

(87) PCT Pub. No.: WO2018/186099
PCT Pub. Date: Oct. 11, 2018

(65) Prior Publication Data
US 2020/0191209 A1    Jun. 18, 2020

(30) Foreign Application Priority Data
Apr. 4, 2017 (JP) .............................. JP2017-074384

(51) Int. Cl.
*F16D 13/64* (2006.01)
*F16D 13/54* (2006.01)

(52) U.S. Cl.
CPC ........... *F16D 13/648* (2013.01); *F16D 13/54* (2013.01)

(58) Field of Classification Search
CPC ............................... F16D 13/64; F16D 13/648
See application file for complete search history.

(56) References Cited

U.S. PATENT DOCUMENTS 5,460,255 A    10/1995  Quigley
6,135,256 A *  10/2000  Han ...................... F16D 13/648
                                                        192/113.36

(Continued)

FOREIGN PATENT DOCUMENTS

CN          2866956 Y       2/2007
DE    102014201867 A1       8/2014

(Continued)

OTHER PUBLICATIONS

International Search Report dated May 22, 2018 filed in PCT/JP2018/008808.

(Continued)

*Primary Examiner* — Ernesto A Suarez
*Assistant Examiner* — James J Taylor, II
(74) *Attorney, Agent, or Firm* — Rankin, Hill & Clark LLP

(57) ABSTRACT

Provided is a clutch friction plate and a clutch device configured so that stiction torque can be reduced and each of in gear, shift feeling, and neutral find can be smoothly performed. A clutch device (100) includes clutch friction plates (101). In the clutch friction plate (101), multiple small-piece-shaped friction members (103) are radially bonded to surfaces of a core bar (102) formed in a flat-plate annular shape through an oil groove (105). Each friction member (103) includes an outer side (104a) facing an outer edge portion of the core bar (102) and an inner side (104b) facing an inner edge portion of the core bar (102) and extending parallel to the outer side (104a), and is formed in a rectangular shape. The friction members (103) are bonded onto the core bar (102) in such a direction that the outer side (Continued)

(104a) and the inner side (104b) are inclined at an inclination angle (θ) with respect to a perpendicular line (CL) perpendicular to a line (OL) connecting the center (O1) of the core bar (102) as the center of rotation of the clutch friction plate (101) and the center (O2) of the friction member (103).

6 Claims, 12 Drawing Sheets

(56) References Cited

U.S. PATENT DOCUMENTS

| | | | |
|---|---|---|---|
| 6,293,382 | B1 | 9/2001 | Nishide et al. |
| 8,061,498 | B2 * | 11/2011 | Tsuboi .................. F16D 13/648 192/113.36 |
| 8,317,008 | B2 * | 11/2012 | Inomori .................. F16D 13/56 192/70.27 |
| 2006/0090980 | A1 * | 5/2006 | Kinoshita ............. F16D 13/648 192/113.36 |
| 2008/0296119 | A1 | 12/2008 | Uchiyama et al. |
| 2008/0308378 | A1 * | 12/2008 | Abe ...................... F16D 13/648 192/70.12 |
| 2016/0333946 | A1 | 11/2016 | Takeuchi et al. |
| 2017/0002873 | A1 | 1/2017 | Neumann et al. |
| 2018/0216673 | A1 * | 8/2018 | Gotz ..................... F16D 13/648 |
| 2018/0328415 | A1 * | 11/2018 | Langenkaemper ..... F16D 13/74 |
| 2020/0025263 | A1 * | 1/2020 | Stope ..................... F16D 13/64 |

FOREIGN PATENT DOCUMENTS

| | | |
|---|---|---|
| DE | 102014208243 A1 | 11/2014 |
| DE | 102013011677 A1 | 1/2015 |
| DE | 102015002310 A1 | 8/2016 |
| DE | 102016108703 A1 | 11/2016 |
| DE | 102016211818 A1 | 1/2017 |
| EP | 2028383 A2 | 2/2009 |
| GB | 916856 A | 1/1963 |
| JP | S54-4951 U | 1/1979 |
| JP | H06-300051 A | 10/1994 |
| JP | 11-022765 A | 1/1999 |
| JP | 2001-221252 A | 8/2001 |
| JP | 2003-090369 A | 3/2003 |
| JP | 2007-285446 A | 11/2007 |
| JP | 2014-231852 A | 12/2014 |
| WO | 2016/180540 A1 | 11/2016 |

OTHER PUBLICATIONS

Decision to Grant a Patent dated Jun. 27, 2018 for the corresponding Japanese Patent Application No. 2017-074384.
Chinese Office Action (CNOA) dated Jul. 22, 2020 issued in the corresponding Chinese Patent Application No. 201880016761.2.
Extended European Search Report (EESR) dated Nov. 6, 2020 issued in the corresponding European Patent Application No. 18781416.5.

* cited by examiner

CLUTCH FRICTION PLATE AND CLUTCH DEVICE

TECHNICAL FIELD

The present invention relates to a clutch friction plate in a clutch device configured to transfer rotary drive force of a motor to a driven shaft or block the rotary drive force and a clutch device including the clutch friction plates.

BACKGROUND ART

Generally, in a vehicle such as a four-wheel vehicle or a two-wheel vehicle, a multiplate clutch device has been used for transferring drive force of a motor such as an engine to a drive target body such as a vehicle wheel or block the drive force. The multiplate clutch device presses multiple flat-plate annular clutch plates against multiple flat-plate annular clutch friction plates to be rotated by drive of the motor or separates the clutch plates from the clutch friction plates, thereby transferring the drive force of the motor to the drive target body or blocking the drive force. For example, Patent Literature 1 below discloses a two-wheel vehicle multiplate clutch device including clutch friction plates. In the clutch friction plate, multiple quadrangular friction members are bonded in a circular ring shape through a clearance forming an oil groove.

CITATION LIST

Patent Literature

PATENT LITERATURE 1: JP-A-2007-285446

However, in the multiplate clutch device described in Patent Literature 1 above, great stiction torque is generated between the clutch friction plate and the clutch plate due to clutch oil interposed between the clutch friction plate and the clutch plate until the clutch friction plate and the clutch plate are fully rotated relative to each other right before the clutch friction plate and the clutch plate are rotated relative to each other. Thus, this device has such a problem that it is difficult to smoothly perform in gear, gear feeling, and neutral find.

In gear described herein indicates that in a self-propelled two-wheel vehicle, a shift stage is changed from a neutral state to a first or second shift stage in a clutch-OFF state in which no drive force is transferred from a motor to a driven shaft. Moreover, gear feeling indicates that a clutch is turned off during traveling of the self-propelled two-wheel vehicle to cancel a current shift stage to change the shift stage to another shift stage. Further, neutral find indicates that after the self-propelled two-wheel vehicle has been stopped, the clutch is turned off to cancel the current shift stage to change the shift stage to the neutral state.

The present invention has been made to cope with the above-described problem. An object of the present invention is to provide a clutch friction plate and a clutch device configured so that stiction torque can be reduced and each of in gear, shift feeling, and neutral find can be smoothly performed.

SUMMARY OF THE INVENTION

For accomplishing the above-described object, a feature of the present invention relates to a clutch friction plate including multiple friction members arranged at intervals along a circumferential direction on a surface of a core bar formed in a flat-plate annular shape. Each friction member includes an outer side facing an outer edge portion of the core bar and extending along the outer edge portion, and an inner side facing an inner edge portion of the core bar and extending parallel to the outer side along the inner edge portion. The outer side and the inner side are inclined with respect to a perpendicular line perpendicular to a line passing through the center of the friction member and the center of the core bar.

According to the feature of the present invention configured as described above, in the clutch friction plate, the outer side facing the outer edge portion of the core bar, in the friction member, and extending along the outer edge portion and the inner side facing the inner edge portion of the core bar and extending parallel to the outer side along the inner edge portion are inclined with respect to the perpendicular line perpendicular to the line passing through the center of the friction member and the center of the core bar. Thus, according to experiment conducted by the inventor(s) of the present invention, the clutch friction plate according to the present invention can reduce stiction torque and can smoothly perform each of in gear, shift feeling, and neutral find as compared to a typical clutch friction plate. Note that such an effect of reducing the stiction torque also means that drag torque can be also reduced.

Moreover, other features of the present invention relate to the above-described clutch friction plate in which the outer side and the inner side are at equal to or greater than 3° and equal to or less than 45° with respect to the perpendicular line.

According to the other features of the present invention configured as described above, the clutch friction plate is configured such that the outer side and the inner side are inclined at an inclination angle of equal to or greater than 3° and equal to or less than 45° with respect to the perpendicular line. Thus, according to the experiment conducted by the inventor(s) of the present invention, the stiction torque can be effectively reduced, and each of in gear, shift feeling, and neutral find can be smoothly performed as compared to the typical clutch friction plate.

Further, the other features of the present invention relate to the above-described clutch friction plate in which the outer side and the inner side are formed to extend linearly.

According to the other features of the present invention configured as described above, the clutch friction plate is configured such that the outer side and the inner side are formed to extend linearly. Thus, the yield rate of the friction member bonded onto the core bar can be improved.

In addition, the other features of the present invention relate to the above-described clutch friction plate in which the friction members are provided in the same direction on front and back surfaces of the core bar.

According to the other features of the present invention configured as described above, the clutch friction plate is configured such that the friction members are provided in the same direction on the front and back surfaces of the core bar. Thus, according to the experiment conducted by the inventor(s) of the present invention, the stiction torque can be reduced as compared to the case of providing the friction members in opposite directions on the front and back surfaces of the core bar.

Moreover, the other features of the present invention relate to the above-described clutch friction plate in which each friction member is formed such that a side extending between each end portion of the outer side and each end portion of the inner side extends linearly.

According to the other features of the present invention configured as described above, the clutch friction plate is configured such that each friction member is formed such that the side extending between each end portion of the outer side and each end portion of the inner side extends linearly. Thus, the yield rate of the friction member bonded onto the core bar can be improved. Moreover, according to the experiment conducted by the inventor(s) of the present invention, each friction plate is formed in a quadrangular shape in the clutch friction member, and therefore, the stiction torque in in gear can be effectively reduced and in gear can be smoothly performed.

Moreover, the present invention can be implemented not only as the technique relating to the clutch friction plate but also as the technique relating to a clutch device using the clutch friction plate.

Specifically, a clutch device for transferring rotary drive force of a motor to a driven shaft or blocking the rotary drive force may include the clutch friction plate according to any one of claims 1 to 5, and a flat-plate annular clutch plate pressed against or separated from the clutch friction plate to transfer or block the rotary drive force. According to this configuration, features and advantageous effects similar to those of the above-described clutch friction plate can be expected from the clutch device.

DESCRIPTION OF THE EMBODIMENTS

Figure 1:
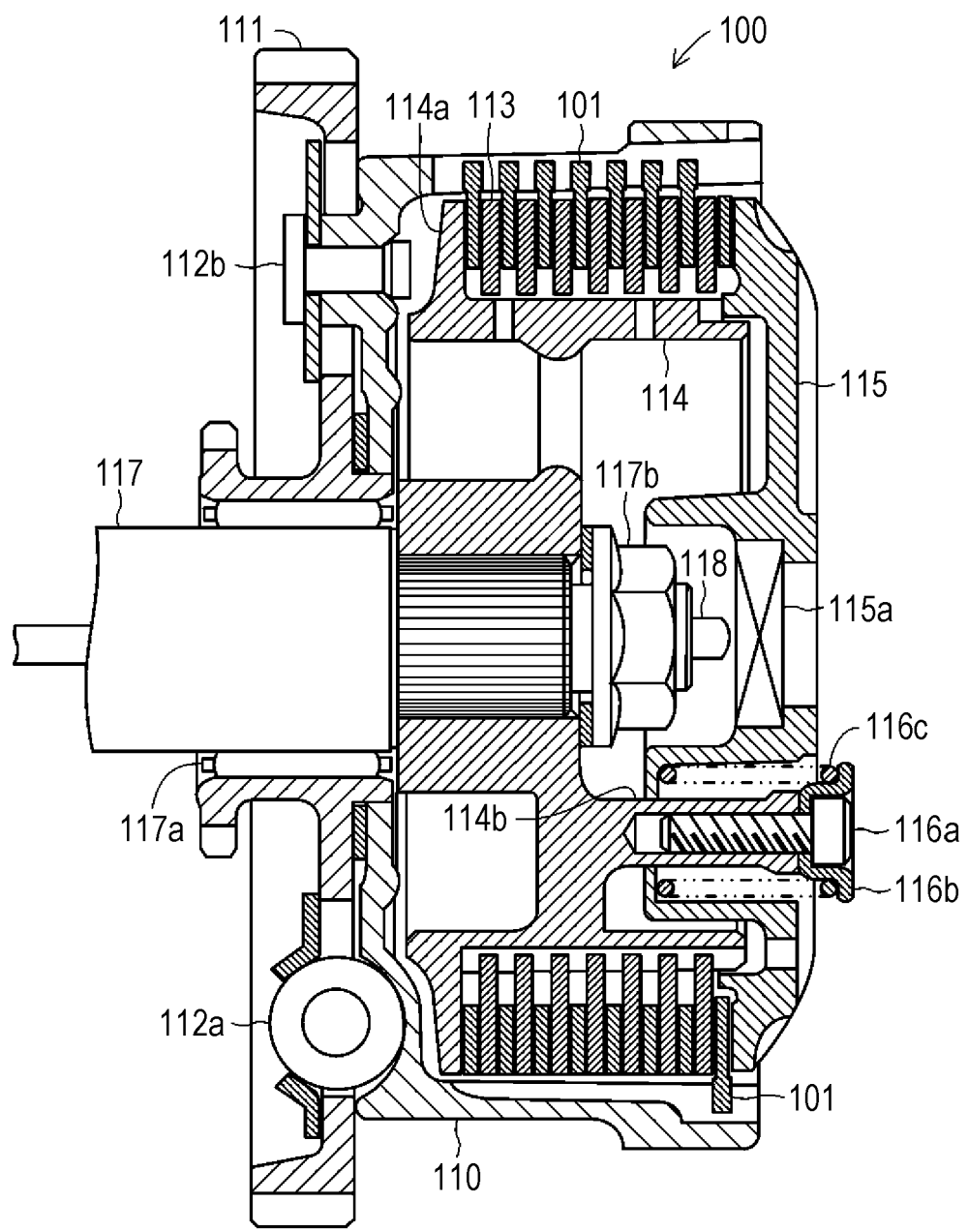
FIG. 1 is a sectional view of an entire configuration of a clutch device according to one embodiment of the present invention.

Hereinafter, one embodiment of a clutch friction plate and a clutch device according to the present invention will be described with reference to the drawings. FIG. 1 is a sectional view of an entire configuration of a clutch device 100 including clutch friction plates 101 according to the present invention. Note that each figure as a reference in the present specification is schematically illustrated for the sake of easy understanding of the present invention, and for example, some components are exaggeratingly illustrated. Thus, dimensions and ratios among the components may vary. The clutch device 100 is a mechanical device configured to transfer drive force of an engine (not shown) as a motor of a self-propelled two-wheel vehicle (a motorcycle) to vehicle wheels (not shown) as a drive target body or block the drive force. The clutch device 100 is arranged between the engine and a transmission (not shown).

Figure 2:
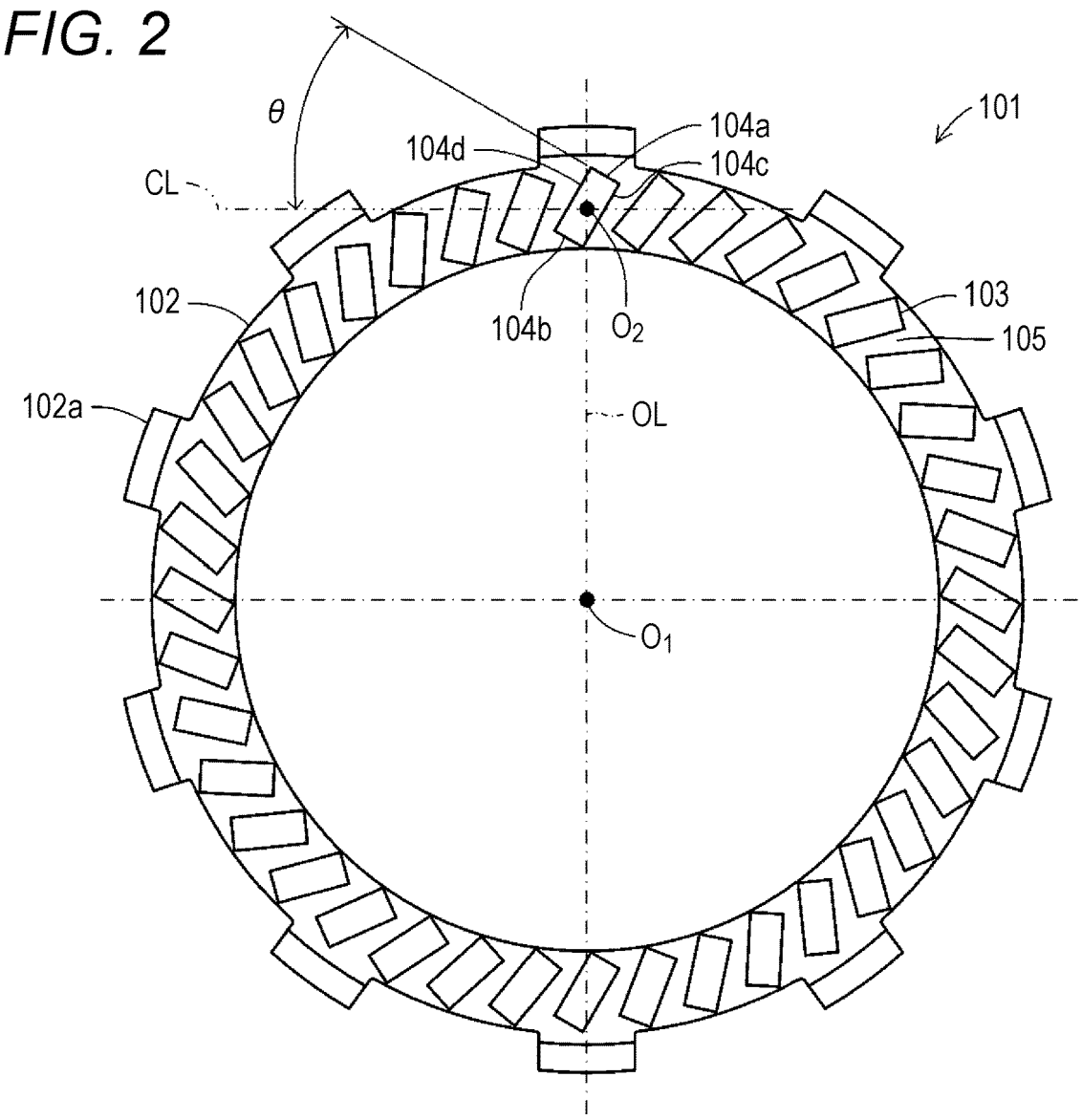
FIG. 2 is a schematic plan view of an outer appearance of a clutch friction plate forming the clutch device illustrated in FIG. 1.

(Configuration of Clutch Device 100) The clutch device 100 includes the clutch friction plates 101. The clutch friction plate 101 is a flat-plate annular component pressed against a later-described clutch plate 113 as illustrated in FIG. 2. The clutch friction plate 101 mainly includes friction members 103 and an oil groove 105 on a flat-plate annular core bar 102. The core bar 102 is a member as a base portion of the clutch friction plate 101. The core bar 102 is molded in such a manner that a thin plate member made of an aluminum material is punched in a substantially annular shape. Spline teeth 102a are formed to radially protrude from an outer peripheral portion of the core bar 102. The spline teeth 102a are spline-fitted in an inner peripheral portion of a later-described housing 110. Moreover, the multiple small-piece-shaped friction members 103 are radially provided on surfaces of the core bar 102 through the oil groove 105.

Each friction member 103 is a component for improving friction force for the clutch plate 113, and is configured in such a manner that a paper material is formed in a rectangular shape. Moreover, each friction member 103 is formed in such a rectangular shape that end portions of an outer side 104a and an inner side 104b are connected to each other by two linearly-extending sides 104c, 104d. The outer side 104a faces an outer edge portion of the core bar 102, and extends along the outer edge portion. The inner side 104b faces an inner edge portion of the core bar 102, and extends parallel to the outer side 104a along the inner edge portion. In this case, the outer side 104a and the inner side 104b are formed with the same length, and are formed with a shorter length than those of the sides 104c, 104d.

These friction members 103 are, with a not-shown adhesive, bonded to a circular ring-shaped portion of the core bar 102 along a circumferential direction at predetermined equal intervals. In this case, each friction member 103 is bonded onto the core bar 102 in such a direction that the outer side 104a and the inner side 104b are inclined at an inclination angle θ with respect to a virtual perpendicular line CL perpendicular to a virtual line OL connecting the center $O_1$ of the core bar 102 as the center of rotation of the clutch friction plate 101 and the center $O_2$ of the friction member 103.

Figure 3:
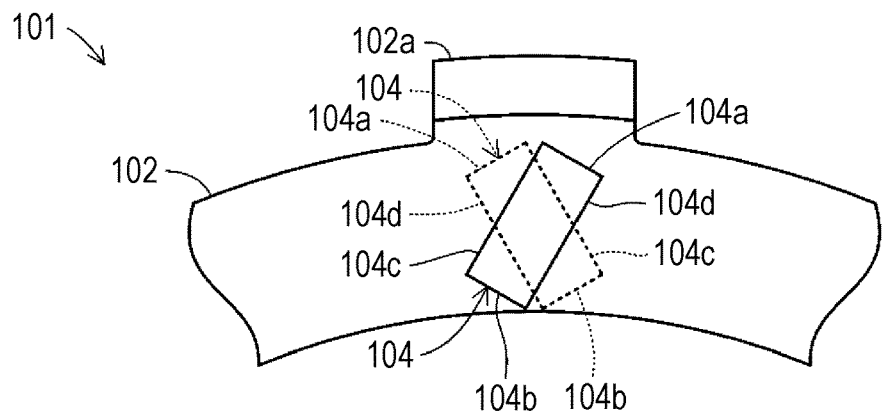
FIG. 3 is a view for describing that friction members are, with opposite phases, bonded to front and back surfaces of a core bar in the clutch friction plate illustrated in FIG. 2.

Moreover, as illustrated in FIG. 3, the friction members 103 are, with opposite phases in opposite directions, bonded to the same positions of the front and back surfaces of the core bar 102 on both surfaces of the clutch friction plate 101 facing the clutch plates 113. Note that FIG. 3 illustrates only one friction member 103 bonded to each of the front and back surfaces of the core bar 102, and indicates the opposite-phase friction member 103 bonded to the back surface by a dashed line.

The center $O_2$ of the friction member 103 as described herein is the center or the center of gravity of the shape of the friction member 103. In this case, e.g., an intersection between two diagonal lines of the friction member 103 or an intersection between a line connecting midpoints of two opposing long sides and a line connecting midpoints of two opposing short sides may be taken as the center of the shape of the friction member 103. Moreover, the inclination angle θ of the friction member 103 is, with respect to the perpendicular line CL, preferably equal to or greater than 3° and equal to or less than 45°, and more preferably equal to greater than 7° and equal to or less than 45°. Note that in the present embodiment, the inclination angle θ of the friction member 103 is 30°.

The oil groove 105 is a portion for circulating later-described clutch oil between adjacent ones of the friction members 103 in a radial direction of the core bar 102. The oil groove 105 is formed by a clearance between adjacent ones of the friction members 103 in the circumferential direction of the core bar 102. The width of the oil groove 105 is determined as necessary according to specifications of the clutch device 100. The width of the oil groove 105 is set shorter than the width of the friction member 103 as a circumferential length. Moreover, the oil groove 105 may be formed such that the width on an outer peripheral side is greater than the width on an inner peripheral side of the core bar 102.

Note that the friction member 103 may be made of a material which can improve friction force between the clutch friction plate 101 and the clutch plate 113, and materials other than the paper material, such as a cork material, a rubber material, or a glass material, can be used. Moreover, the clutch friction plates 101 provided with the friction members 103 and the oil grooves 105 are held by the housing 110.

The housing 110 is a component housing the clutch plates 113 and a plate holder 114 together with the clutch friction plates 101 and forming part of a housing of the clutch device 100. The housing 110 is configured in such a manner that an aluminum alloy member is formed in a closed-end tubular shape. More specifically, the housing 110 holds, inside the closed-end tubular portion, each of the multiple (eight in the present embodiment) clutch friction plates 101 by spline fitting through the spline teeth 102a in a state in which each clutch friction plate 101 is displaceable along an axial direction of the housing 110 and is rotatable integrally with the housing 110.

As viewed in the figure, an input gear 111 is fixed to a left side surface of the housing 110 with a rivet 112b through a torque damper 112a. The input gear 111 is rotatably driven with the input gear 111 engaging with a not-shown drive gear to be rotatably driven by drive of the engine (not shown). Thus, the housing 110 is, through the input gear 111, integrally rotatably driven with a rotary drive shaft of the engine.

The clutch plate 113 is a flat-plate annular component pressed against the clutch friction plate 101. The clutch plate 113 is molded in such a manner that a thin plate member made of a steel plate cold commercial (SPCC) material is punched in an annular shape. In this case, an internal-tooth-shaped spline for spline fitting in the plate holder 114 provided inside the housing 110 is formed at an inner peripheral portion of each clutch plate 113. Thus, each clutch plate 113 is held by the plate holder 114 with the clutch friction plate 101 being sandwiched between adjacent ones of the clutch plates 113.

Moreover, a not-shown oil groove having a depth of several μm to several tens of μm for holding the clutch oil is formed at each side surface (front and back surfaces) of each clutch plate 113. Note that for the purpose of improvement of wear resistance, surface hardening treatment is performed for each side surface (the front and back surfaces) of the clutch plate 113 provided with the oil groove. Since such surface hardening treatment does not directly relate to the present invention, detailed description thereof will be omitted.

The plate holder 114 is a component to be integrally rotatably driven with the plate holder 114 holding each of the multiple clutch plates 113. The plate holder 114 is configured in such a manner that an aluminum alloy member is formed in a shape having double cylindrical portions. Moreover, the plate holder 114 holds, on an outer peripheral surface of the outer tubular portion in a radial direction, each of the multiple (seven in this embodiment) clutch plates 113 by spline fitting in a state in which each clutch plate 113 is displaceable along an axial direction of the plate holder 114 and rotatable integrally with the plate holder 114 with the clutch friction plate 101 being sandwiched between adjacent ones of the clutch plates 113. In this case, on the outer tubular portion of the plate holder 114 in the radial direction, the clutch plates 113 pressed by a later-described pressing cover 115 and a receiving body 114a receiving the clutch friction plate 101 are formed in a state protruding outward in the radial direction.

Moreover, a tubular support column 114b is formed at each of three coupling portions coupling the inner and outer tubular portions of the plate holder 114 in the radial direction (only one tubular support column 114b is illustrated in FIG. 1). These three tubular support columns 114b are formed to protrude outward (the right side as viewed in the figure) in the axial direction of the plate holder 114. The pressing cover 115 arranged at a position concentric with the plate holder 114 is assembled with each tubular support column 114b through a bolt 116a, a receiving cap 116b, and a coil spring 116c.

The pressing cover 115 is formed in a substantially discoid shape having the substantially same outer diameter as the outer diameter of the clutch friction plate 101. The pressing cover 115 is pressed toward the plate holder 114 by the coil spring 116c. Moreover, at an inner center portion of the pressing cover 115, a release bearing 115a pressed by a later-described push rod 118 is provided at a position facing a right tip end portion of the push rod 118 as viewed in the figure.

The inside of the plate holder 114 is filled with a predetermined amount of clutch oil (not shown). The clutch oil is supplied to between the clutch friction plate 101 and the clutch plate 113 to absorb friction heat generated between the clutch friction plate 101 and the clutch plate 113 and prevent wear of the friction member 103. That is, the clutch device 100 is a so-called wet multiplate friction clutch device. Moreover, many spline grooves are formed along the axial direction of the plate holder 114 at an inner peripheral surface of the inner tubular portion of the plate holder 114 in the radial direction. A shaft 117 is spline-fitted in these spline grooves.

The shaft 117 is a shaft body formed in a hollow shape. One end side (the right side as viewed in the figure) of the shaft 117 rotatably supports the input gear 111 and the housing 110 through a needle bearing 117a, and supports the spline-fitted plate holder 114 in a fixed manner through a nut 117b. That is, the plate holder 114 is arranged concentrically with the housing 110 by the shaft 117, and is rotatable integrally with the shaft 117. On the other hand, the other end portion (the left side as viewed in the figure) of the shaft 117 is coupled to the not-shown transmission of the two-wheel vehicle.

The shaft-shaped push rod 118 is arranged to penetrate a hollow portion of the shaft 117 in a state in which the push rod 118 protrudes from one end portion (the right side as viewed in the figure) of the shaft 117. The side (the left side as viewed in the figure) of the push rod 118 opposite to the end portion protruding from one end portion (the right side as viewed in the figure) of the shaft 117 is coupled to a not-shown clutch operation lever of the two-wheel vehicle. The push rod 118 slides, by operation of the clutch operation lever, along an axial direction (the right-to-left direction as viewed in the figure) of the shaft 117 in the hollow portion of the shaft 117 to press the release bearing 115a.

(Method for Manufacturing Clutch Friction Plate 101)

Figure 4:
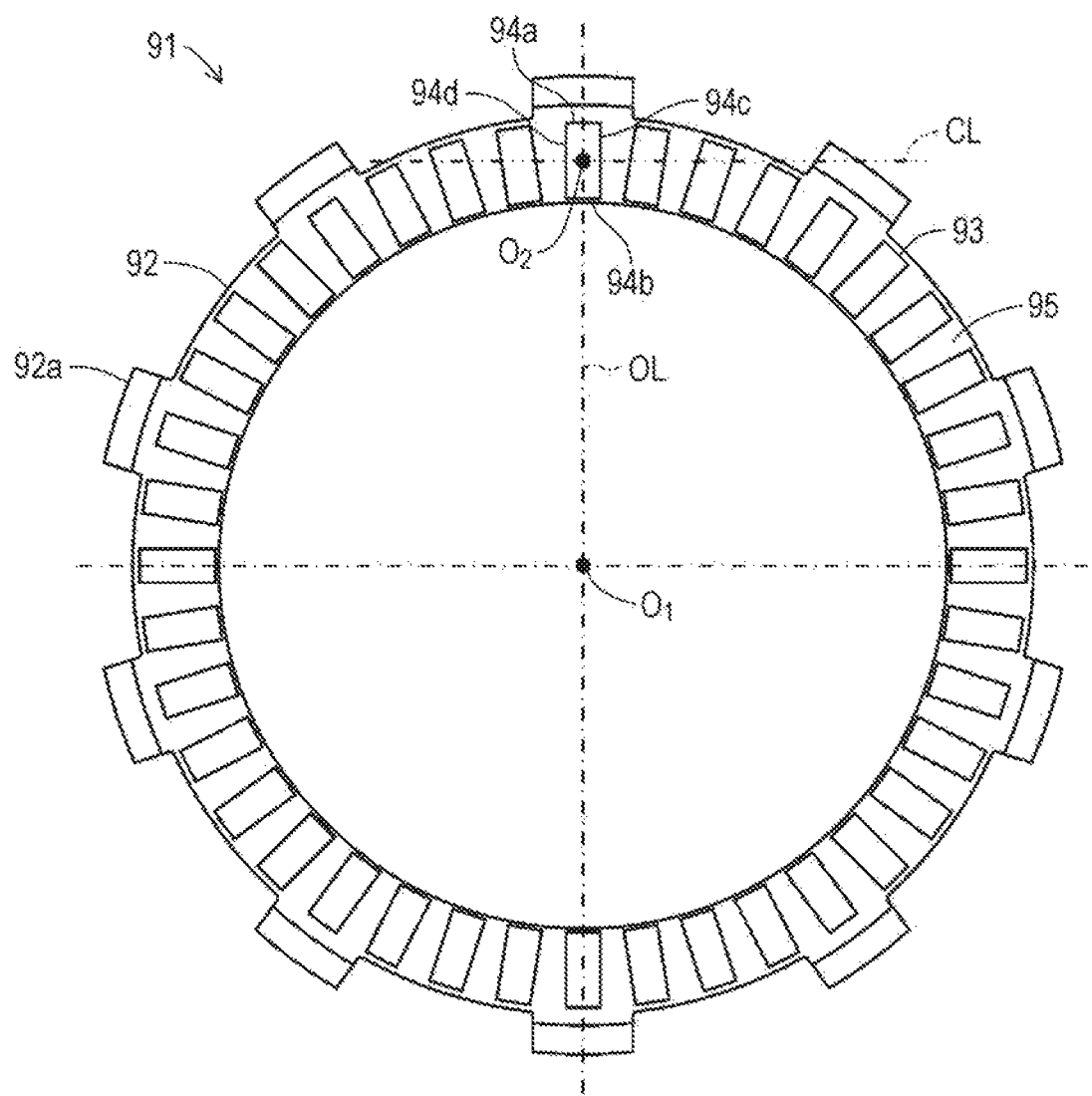
FIG. 4 is a schematic plan view of an outer appearance of a typical clutch friction plate.

The method for manufacturing the clutch friction plate 101 will be briefly described herein. For manufacturing the clutch friction plate 101, the technique of bonding friction members 93 to a core bar 92 of a clutch friction plate 91 according to a typical technique can be used. In the clutch friction plate 91 according to the typical technique as described herein, each friction member 93 formed in a rectangular shape including an outer side 94a, an inner side 94b, and sides 94c, 94d is bonded onto the core bar 92 through an oil groove 95 as illustrated in FIG. 4. In this case, each friction member 93 is bonded onto the core bar 92 in such a direction that the outer side 94a and the inner side 94b are parallel to a perpendicular line CL perpendicular to a line OL connecting the center $O_1$ of the core bar 92 as the center of rotation of the clutch friction plate 91 and the center $O_2$ of the friction member 93.

Figure 5:
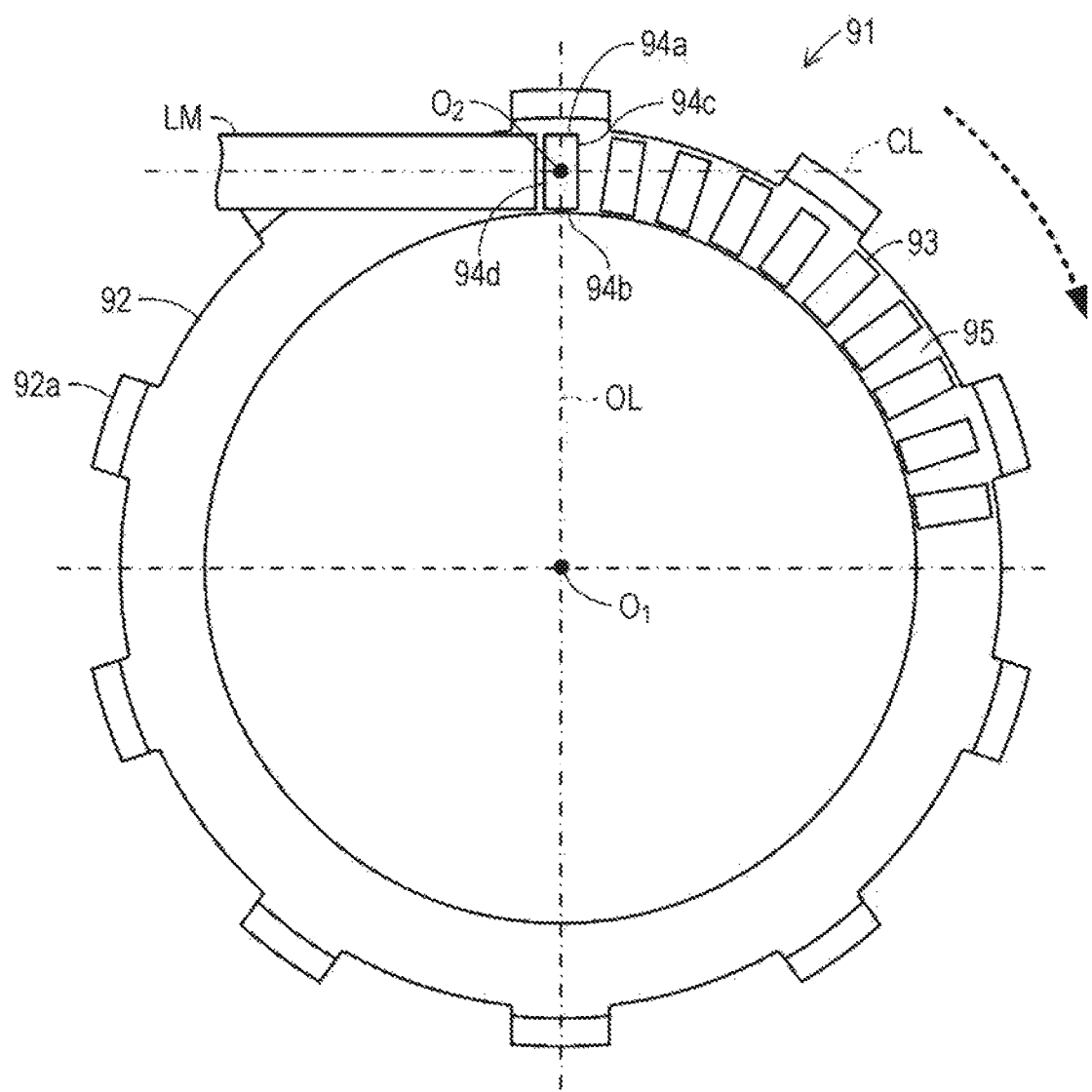
FIG. 5 is a schematic view for describing the step of bonding friction members onto a core bar in the typical clutch friction plate illustrated in FIG. 4.

Moreover, in the clutch friction plate 91 according to the typical technique as configured as described above, the friction member 93 is supplied and bonded from a direction (the left side as viewed in the figure) perpendicular to a radial direction of the core bar 92 at the position of bonding of the friction member 93 to the core bar 92 as illustrated in FIG. 5, for example. In this case, the friction member 93 is supplied to an annular portion of the core bar 92 while an elongated friction member LM being formed to extend in an elongated band shape is being cut by a cutter (not shown). Moreover, the core bar 92 is, about the center $O_1$ of the core bar 92, supported on a turntable rotatable by a predetermined angle in a direction indicated by a dashed arrow in the figure. Further, on the turntable, an adhesive is applied to the core bar 92 at a position upstream of the position to which the friction member 93 is supplied.

Figure 6:
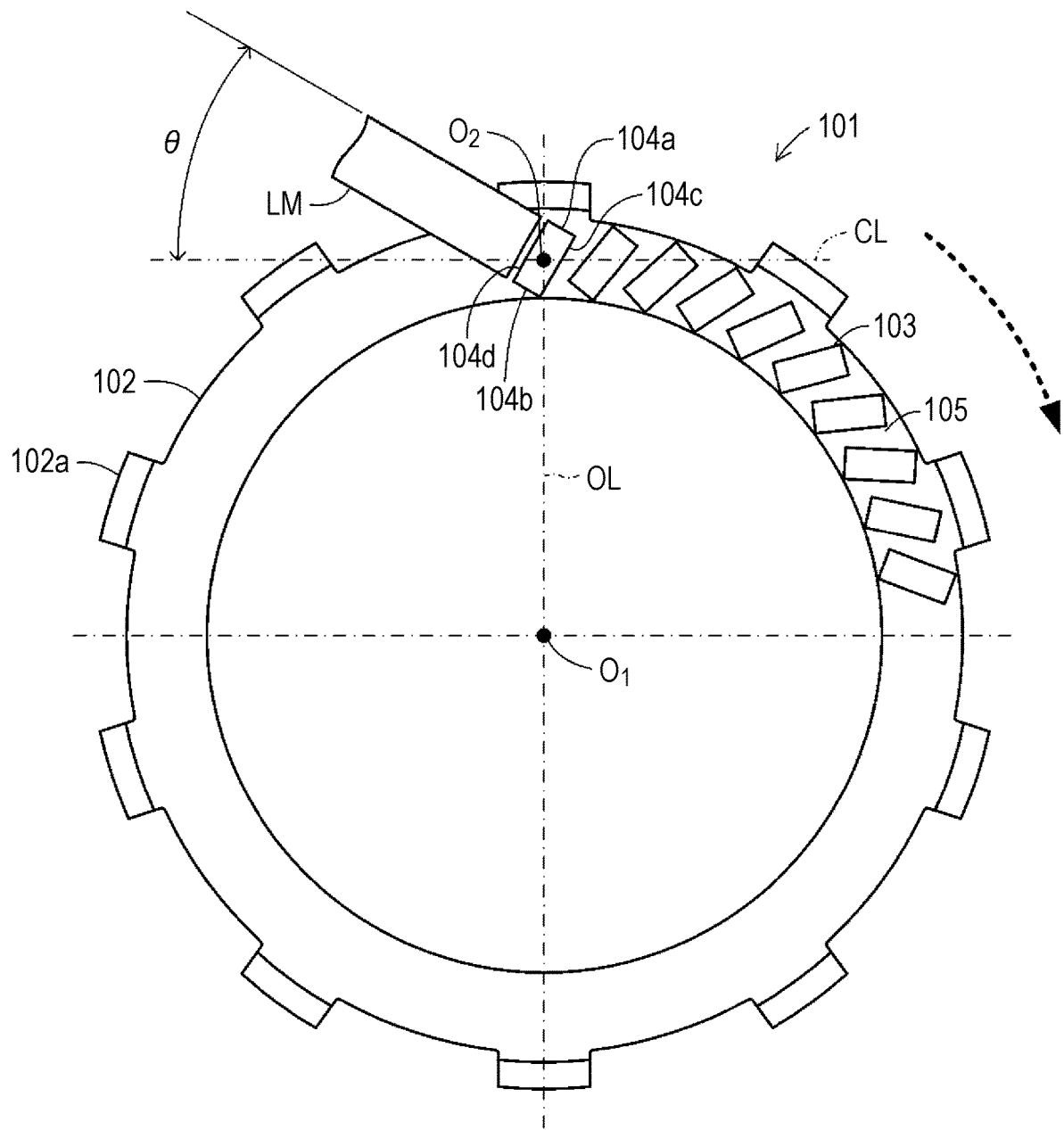
FIG. 6 is a schematic view for describing the step of bonding the friction members onto the core bar in the clutch friction plate illustrated in FIG. 2.
Figure 7:
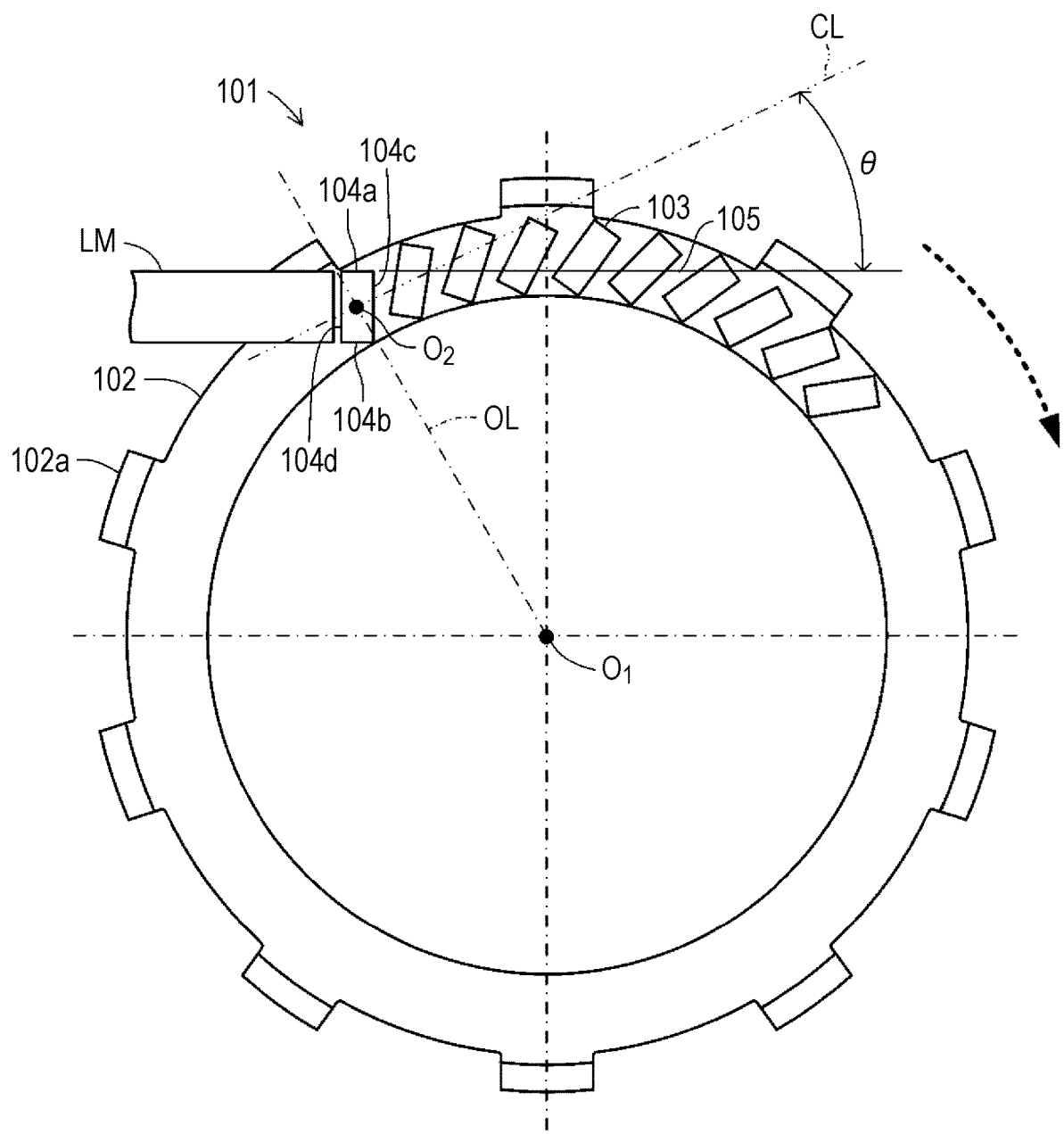
FIG. 7 is a schematic view for describing the step of bonding the friction members onto the core bar in the clutch friction plate illustrated in FIG. 2 in another technique.

As illustrated in, e.g., FIG. 6 or 7, in the clutch friction plate 101 according to the present embodiment, the friction member 103 in the direction inclined at the inclination angle θ with respect to the radial direction of the core bar 102 is supplied and bonded to the position of bonding of the friction member 103 on the core bar 102 supported on a turntable (not shown). In this case, in FIG. 6, an elongated friction member LM for supplying the friction member 103 is provided inclined at the inclination angle θ at the same position as the supply position of the friction member 93 illustrated in FIG. 5 on the core bar 102. Moreover, in FIG. 7, the elongated friction member LM for supplying the friction member 103 is provided at such a position that the friction member 103 can be supplied to the core bar 102 in the direction inclined at the inclination angle θ in a state in which the elongated friction member LM is in the same direction as the direction of supplying the friction member 93 as illustrated in FIG. 5.

Note that regarding the process of bonding the friction member 103 onto the core bar 102, the friction member 103 may be punched out from a great friction member sheet and be supplied onto the core bar 102, or may be manually bonded onto the core bar 102.

(Operation of Clutch Device 100)

Next, operation of the clutch device 100 configured as described above will be described. As described above, the clutch device 100 is arranged between the engine and the transmission in the vehicle. By operation of the clutch operation lever by an operator of the vehicle, transfer of the drive force of the engine to the transmission or blocking of such force transfer is performed.

That is, in a case where the operator of the vehicle operates the clutch operation lever (not shown) to retreat (displace to the left side as viewed in the figure) the push rod 118, a tip end portion of the push rod 118 is brought into a state in which the push rod 118 does not press the release bearing 115a, and the pressing cover 115 presses the clutch plates 113 by elastic force of the coil spring 116c. Thus, the clutch friction plates 101 and the clutch plates 113 are displaced toward the receiving body 114a formed in a flange shape at an outer peripheral surface of the plate holder 114 while being pressed against each other. Accordingly, the clutch friction plates 101 and the clutch plates 113 are brought into a friction-coupled state. As a result, the drive force of the engine transferred to the input gear 111 is transferred to the transmission through the housing 110, the clutch friction plates 101, the clutch plates 113, the plate holder 114, and the shaft 117.

On the other hand, in a case where the operator of the vehicle operates the clutch operation lever (not shown) to advance (displace to the right side as viewed in the figure) the push rod 118, the tip end portion of the push rod 118 is brought into a state in which the push rod 118 presses the release bearing 115a. Thus, the pressing cover 115 is displaced to the right side as illustrated in the figure while being against the elastic force of the coil spring 116c, and the pressing cover 115 and the clutch plates 113 are separated from each other. Accordingly, the coupled state in which the clutch friction plates 101 and the clutch plates 113 are pressed against each other while being displaced toward the pressing cover 115 is cancelled, and the clutch friction plates 101 and the clutch plates 113 are separated from each other. As a result, the drive force is no longer transferred from the clutch friction plates 101 to the clutch plates 113, and transfer of the drive force, which has been transferred to the input gear 111, of the engine to the transmission is blocked.

In rotation of the clutch friction plates 101 in such a pressed or separated state among the clutch friction plates 101 and the clutch plates 113, the clutch oil on an inner peripheral side of the clutch friction plate 101 is displaced toward an outer peripheral side of the clutch friction plate 101 according to the magnitude of centrifugal force due to rotation of the clutch friction plate 101. In this case, the clutch oil present on the inner peripheral side of the clutch friction plate 101 is guided to the outer peripheral side of the clutch friction plate 101 through the oil groove 105 of the clutch friction plate 101. Thus, according to experiment conducted by the inventor(s) of the present invention, it has been confirmed that stiction torque is reduced as compared to the clutch friction plate in the typical technique.

Figure 8:
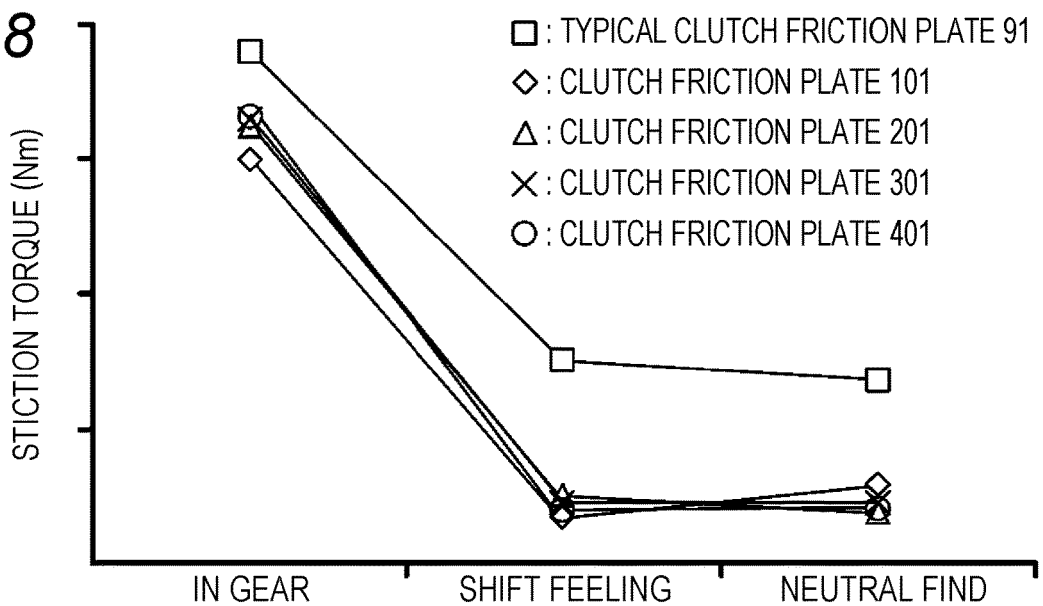
FIG. 8 is a graph of stiction torque of each of the typical clutch friction plate illustrated in FIG. 4, the clutch friction plate illustrated in FIG. 2, and clutch friction plates illustrated in FIGS. 9 to 11 in three situations in operation of a self-propelled two-wheel vehicle for clearly describing the effect of reducing stiction torque of the clutch friction plate according to the present invention.

FIG. 8 illustrates results of the experiment conducted by the inventor(s) of the present invention. As compared to the clutch friction plate 91 according to the typical technique, the stiction torque (Nm) of each of the clutch friction plate 101, a clutch friction plate 201, a clutch friction plate 301, and a clutch friction plate 401 according to the present invention is illustrated for each of three situations. Three situations described herein are "IN GEAR," "SHIFT FEELING," and "NEUTRAL FIND" as three scenes in operation of the self-propelled two-wheel vehicle. "IN GEAR" is a scene in which in the self-propelled two-wheel vehicle, a shift stage is changed from a neutral state to a first or second shift stage in a clutch-OFF state in which no drive force is transferred from the motor to a driven shaft. Moreover, "SHIFT FEELING" is a scene in which the clutch is turned off during traveling of the self-propelled two-wheel vehicle to cancel a current shift stage to change the shift stage to another shift stage. Further, "NEUTRAL FIND" is a scene in which after the self-propelled two-wheel vehicle has been stopped, the clutch is turned off to cancel the current shift stage to change the shift stage to the neutral state.

Figure 9:
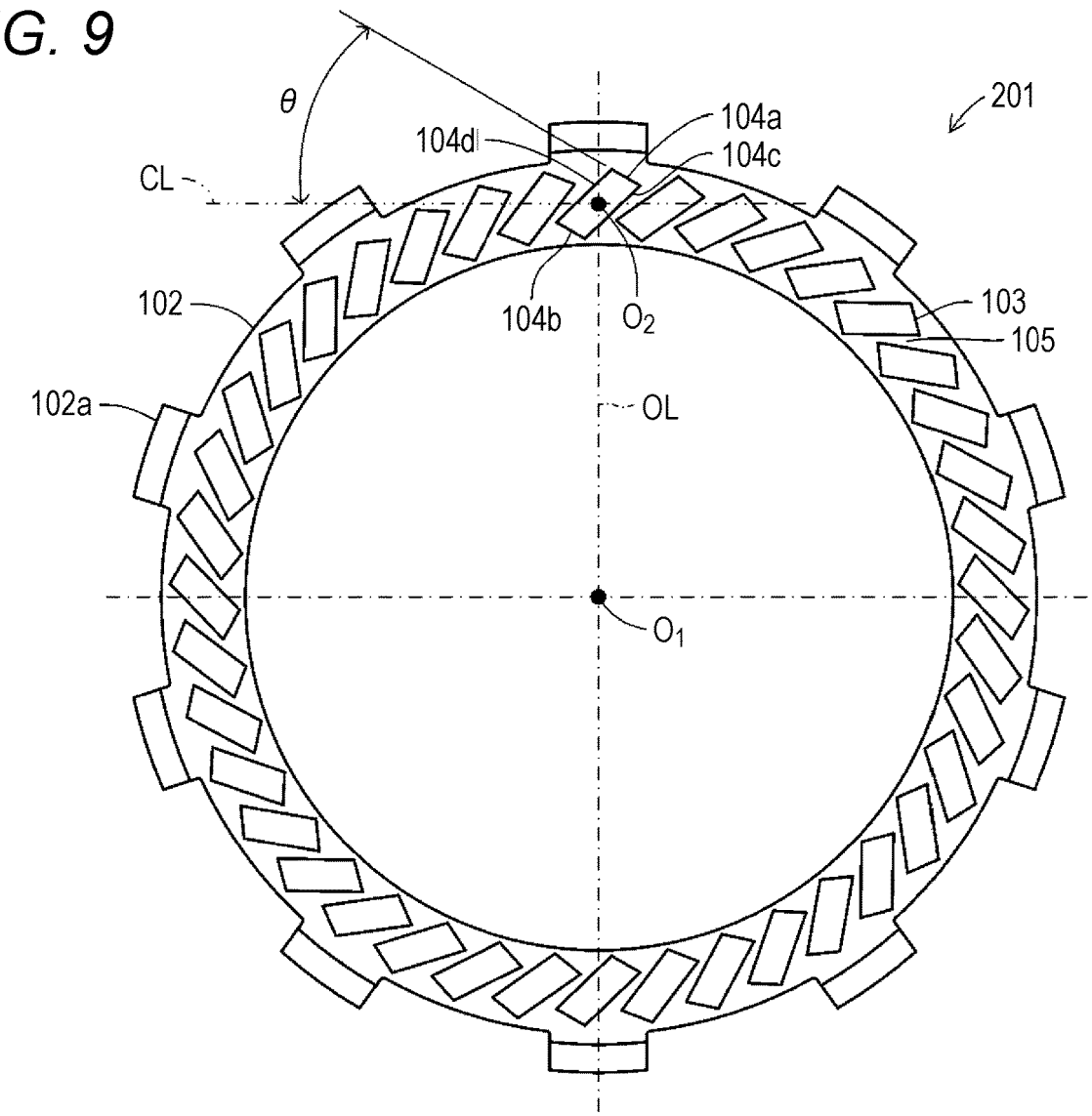
FIG. 9 is a schematic plan view of an outer appearance of a clutch friction plate according to a variation of the present invention.
Figure 10:
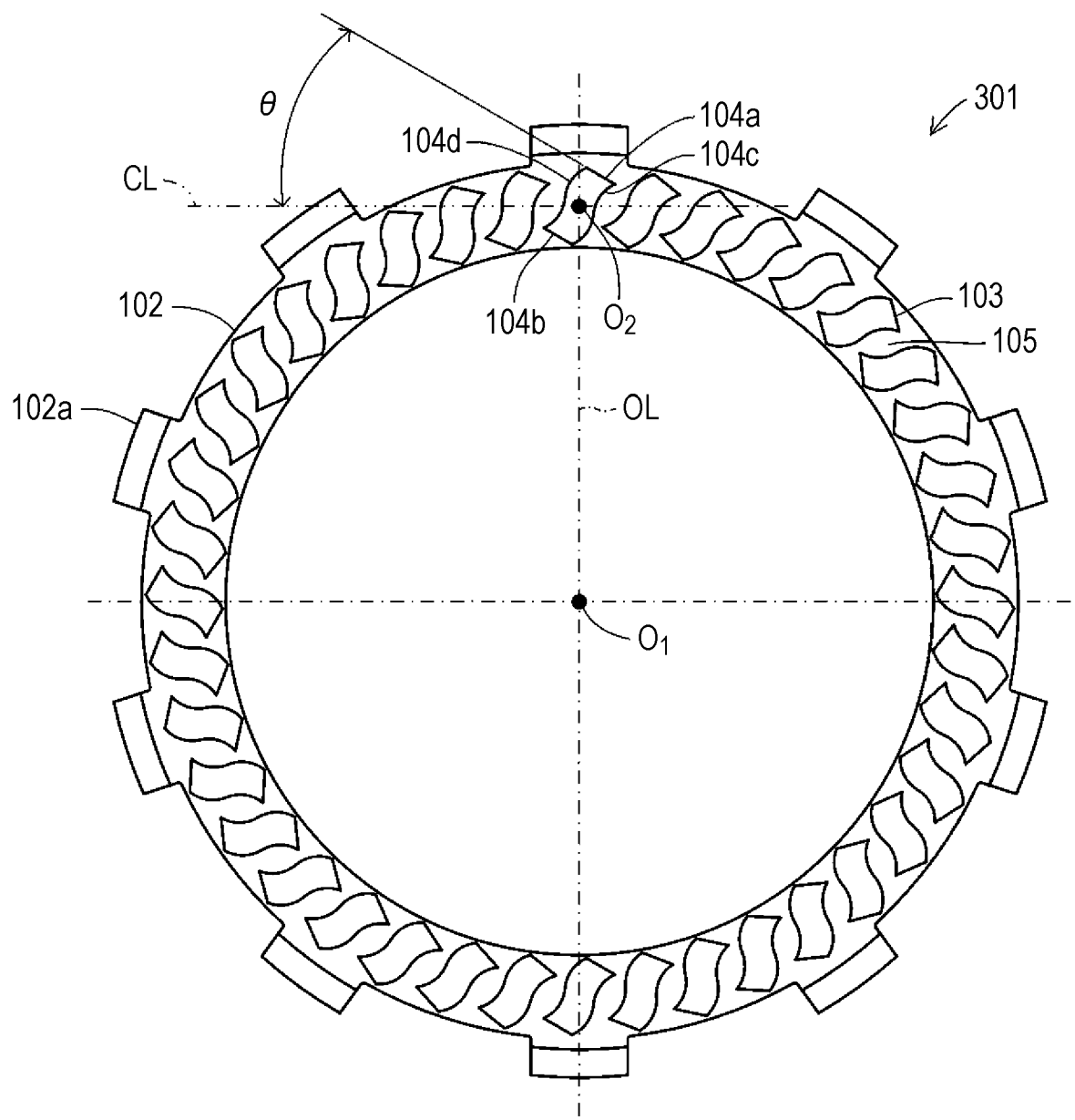
FIG. 10 is a schematic plan view of an outer appearance of a clutch friction plate according to another variation of the present invention.

Moreover, three clutch friction plates 201, 301, 401 and the clutch friction plate 101 are common to each other on such a point that the outer side 104a and the inner side 104b of each friction member 103 are inclined at the inclination angle θ with respect to the perpendicular line CL, but are different from each other in the shapes of the sides 104c, 104d. Specifically, as illustrated in FIG. 9, in the clutch friction plate 201, the friction plate 103 is formed in a parallelogram shape. The angle of each of four corners of the friction plate 103 is an angle other than 90°, and opposing corners in each pair have an equal angle. In the clutch friction plate 301, the sides 104c, 104d of the friction plate 103 are formed in such a curved shape that two arcs in raised and recessed shapes are continuously combined, as illustrated in FIG. 10. Further, the clutch friction plate 401 is formed in a shape illustrated in FIG. 11. In this shape, the side 104c of the friction plate 103 is formed by a single raised arc. In addition, the side 104d is formed by a single recessed arc corresponding to the side 104c.

According to the experiment results illustrated in FIG. 8, any of the clutch friction plates 101, 201, 301, 401 according to the present invention can reduce the stiction torque as compared to the clutch friction plate 91 as a reference. Specifically, in "SHIFT FEELING" and "NEUTRAL FIND," the clutch friction plates 101, 201, 301, 401 according to the present invention can reduce the stiction torque to the half of the stiction torque of the clutch friction plate 91 as the reference or less. It is assumed that this is because entrance of part of the clutch oil into the oil groove 105 is, in rotation of the clutch friction plate 101, 201, 301, 401 relative to the clutch plate 113, interfered by inclination of the friction member 103 and it is accordingly difficult to maintain an oil film.

As understood from description of operation above, in the clutch friction plate 101, the outer side 104a facing the outer edge portion of the core bar 102 of the friction member 103 and extending along the outer edge portion and the inner side 104b facing the inner edge portion of the core bar 102 and extending parallel to the outer side 104a along the inner edge portion are, according to the above-described embodiment, inclined with respect to the perpendicular line CL perpendicular to the line passing through the center $O_2$ of the friction member 103 and the center $O_1$ of the core bar. With this configuration, the clutch friction plate 101 according to the present invention can reduce, according to the experiment conducted by the inventor(s) of the present invention, the stiction torque as compared to the typical clutch friction plate 91, and can smoothly perform each of in gear, shift feeling, and neutral find. Note that such an effect of reducing the stiction torque also means that drag torque can be also reduced.

Further, implementation of the present invention is not limited to the above-described embodiment, and various changes can be made without departing from the object of the present invention. Note that in each variation described below, the same reference numerals are used to represent components similar to those of the clutch friction plate 101 of the above-described embodiment, and description thereof will be omitted.

For example, in the above-described embodiment, the friction member 103 is formed in the rectangular shape. In this case, as clearly seen from FIG. 8, the clutch friction plate 101 can most reduce the stiction torque in "IN GEAR" because the sides 104c, 104d of the friction member 103 are formed straight.

Figure 12:
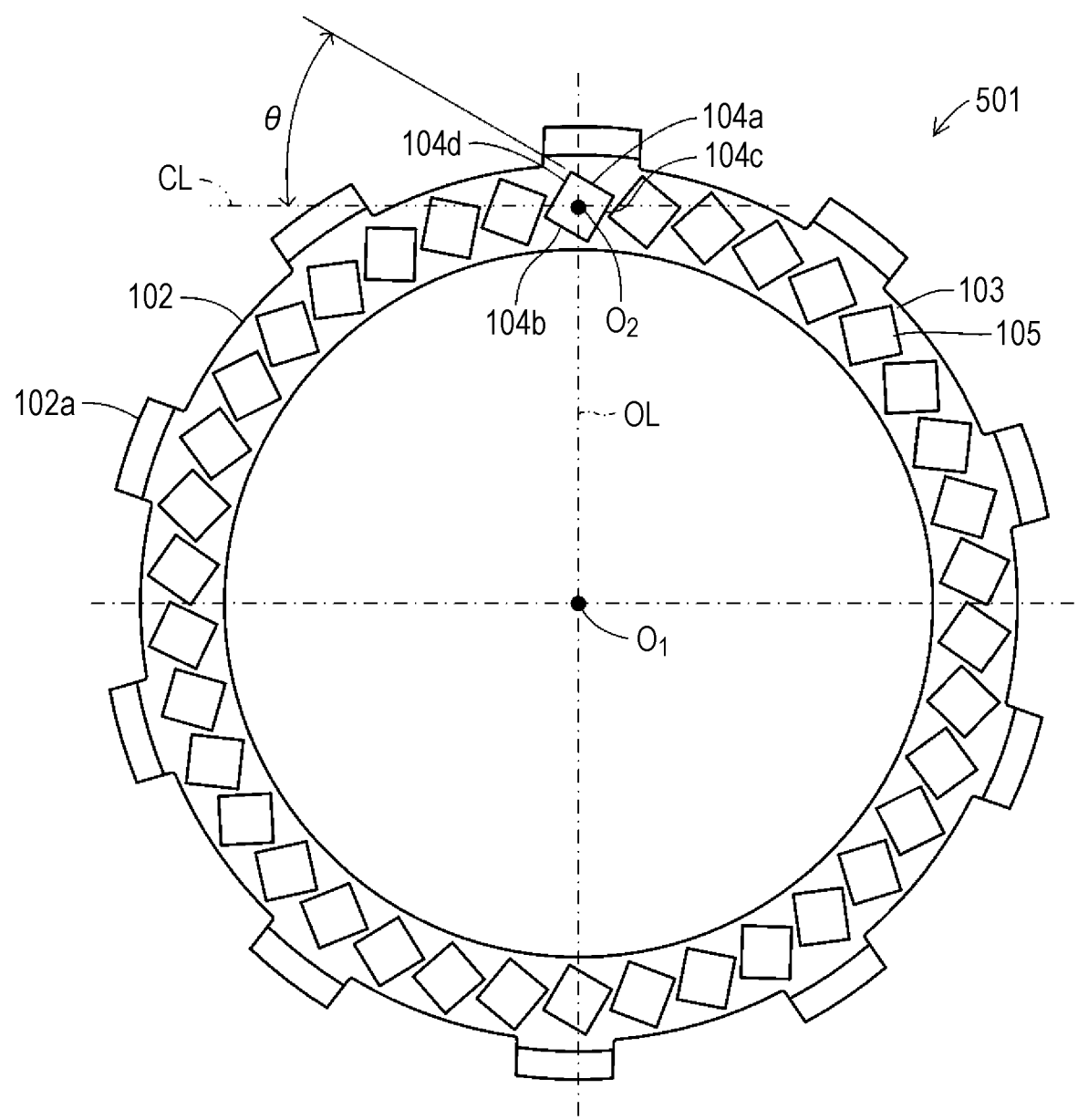
FIG. 12 is a schematic plan view of an outer appearance of a clutch friction plate according to still another variation of the present invention.
Figure 13:
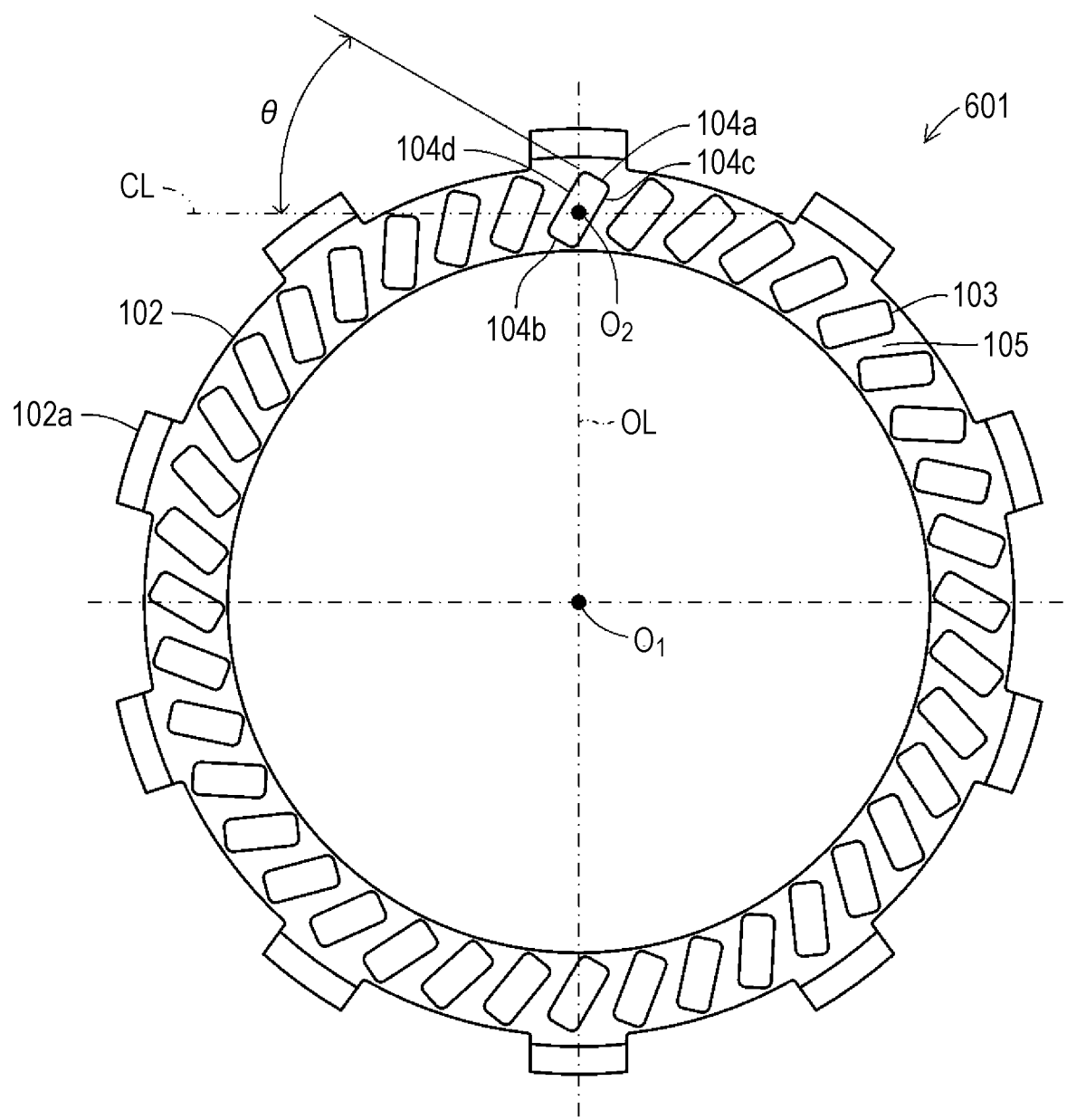
FIG. 13 is a schematic plan view of an outer appearance of a clutch friction plate according to still another variation of the present invention.

However, the friction member 103 may be configured such that the outer side 104a and the inner side 104b are inclined with respect to the perpendicular line CL. Thus, as in a clutch friction plate 501 illustrated in FIG. 12, the friction member 103 may be formed in other quadrangular shapes than the rectangular shape, such as a square. Alternatively, as in a clutch friction plate 601 illustrated in FIG. 13, the friction member 103 may be formed such that four corner portions are rounded to define curved lines. In this case, the friction member 103 is formed in a square shape (including not only a precise square shape but also a substantial square shape (a rectangular shape close to a square shape)) so that the stiction torque can be reduced even in a case where a region into which the clutch oil can flow is formed without the presence of the friction member 103 at the outer edge portion and/or the inner edge portion of the core bar 102.

Figure 11:
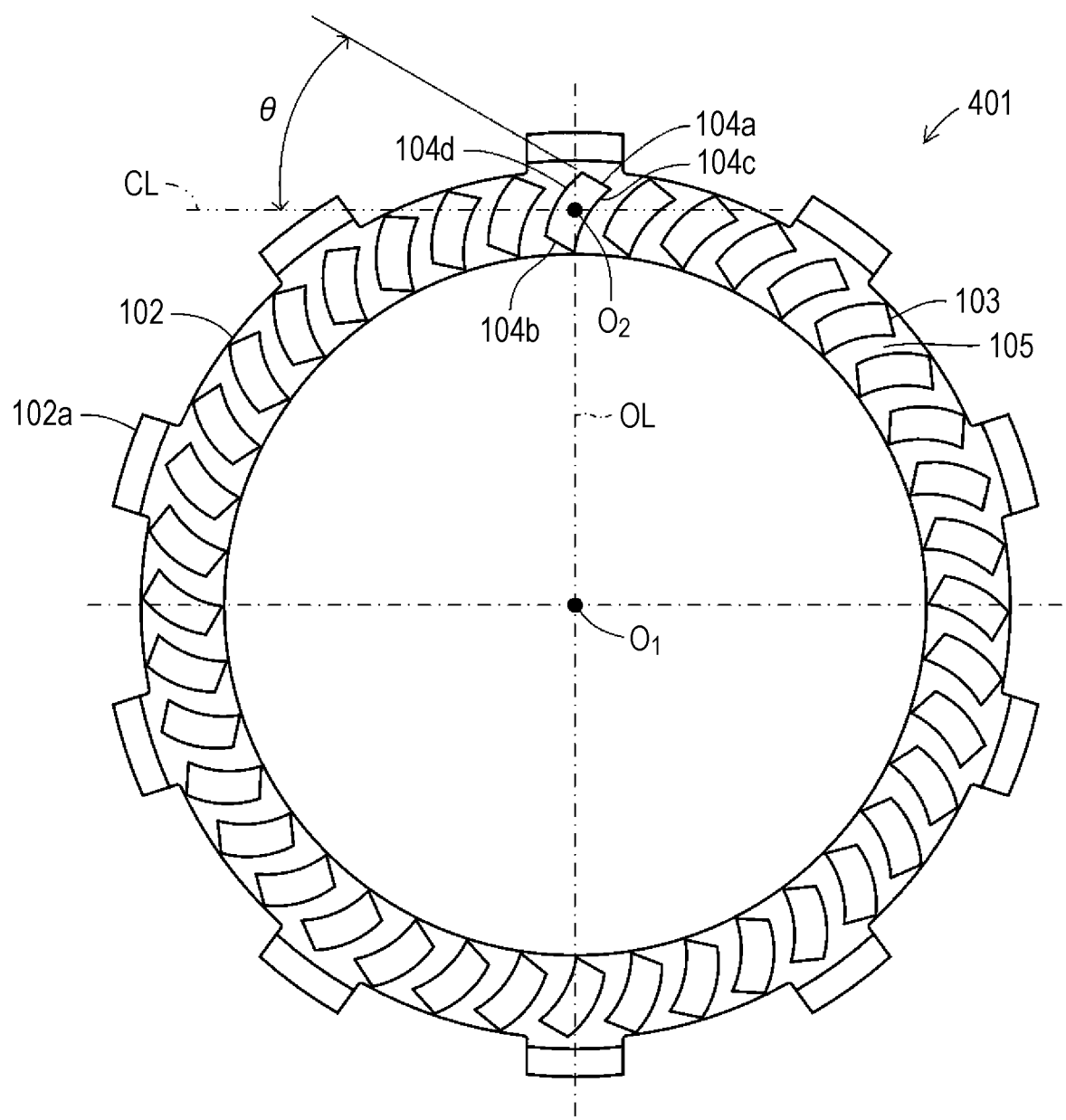
FIG. 11 is a schematic plan view of an outer appearance of a clutch friction plate according to still another variation of the present invention.
Figure 14:
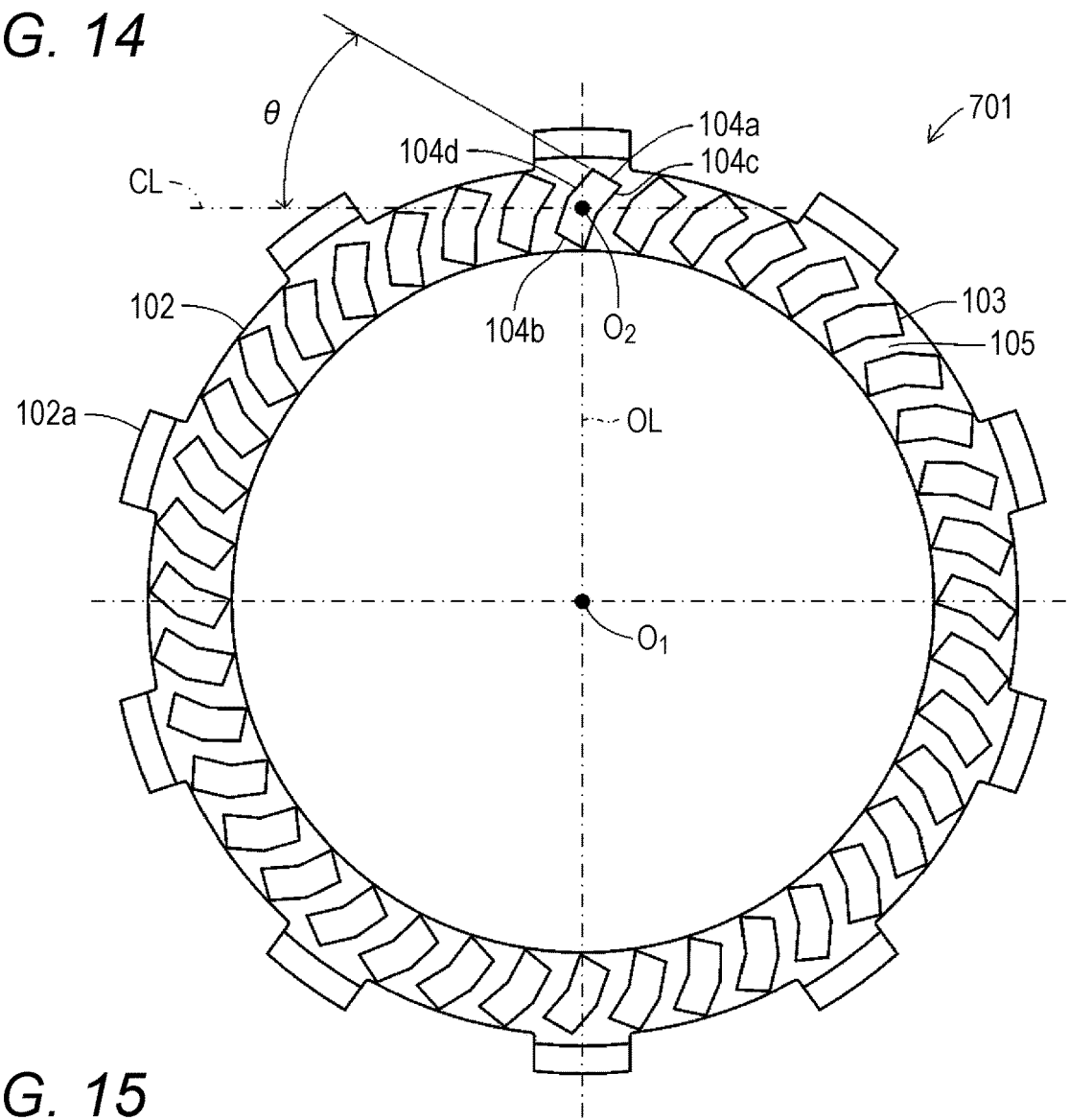
FIG. 14 is a schematic plan view of an outer appearance of a clutch friction plate according to still another variation of the present invention.

Moreover, in the friction member 103, the sides 104c, 104d may be formed by curved lines as illustrated in FIG. 10 or 11, or may be formed by bent lines as in a clutch friction plate 701 illustrated in FIG. 14. Further, the number of friction members 103 and the number of oil grooves 105 provided on the core bar 102 are not limited to those of the above-described embodiment, and are determined as necessary according to the specifications of the clutch device 100.

In addition, in the above-described embodiment, the outer side 104a and the inner side 104b are linearly formed in the friction member 103. However, in the friction member 103, the outer side 104a and the inner side 104b may be formed in parallel. Thus, in the friction member 103, the outer side 104a and the inner side 104b may be curved lines. In this case, the friction member 103 is bonded onto the core bar 102 such that a virtual line connecting both end portions of the outer side 104a and a virtual line connecting both end portions of the inner side 104b are inclined with respect to the perpendicular line CL.

Figure 15:
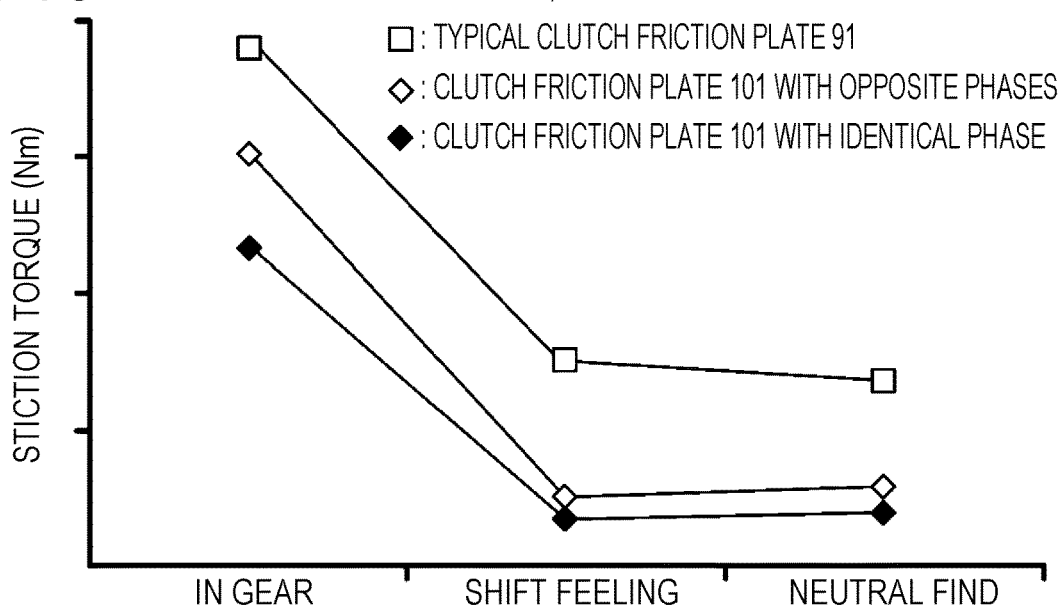
FIG. 15 is a graph of stiction torque of a clutch friction plate configured such that friction members are bonded to front and back surfaces of a core bar with the same phase and stiction torque of a clutch friction plate configured such that friction members are bonded to front and back surfaces of a core bar with opposite phases in three situations in operation of a self-propelled two-wheel vehicle for clearly describing a torque reduction effect when the friction members are, with the same phase, bonded to the front and back surfaces of the core bar in the clutch friction plate.

Moreover, in the above-described embodiment, the friction members 103 are bonded to the front and back surfaces of the core bar 102 with the opposite phases in the opposite directions. However, the friction members 103 can be bonded to the front and back surfaces of the core bar 102 with the same phase in the same direction. According to results of the experiment conducted by the inventor(s) of the present invention as illustrated in FIG. 15, the clutch friction plate 101 configured such that the friction members 103 are bonded to the front and back surfaces of the core bar 102 with the same phase can reduce the stiction torque as compared to the clutch friction plate 101 configured such that the friction members 103 are bonded to the front and back surfaces of the core bar 102 in the opposite directions. Note that regarding the friction member 103 bonded to each of the front and back surfaces of the core bar 102, both friction members 103 may be bonded to the same positions on the front and back surfaces, or may be bonded to different positions on the front and back surfaces.

Further, in the above-described embodiment, the clutch device 100 includes the multiple clutch friction plates 101 and the multiple clutch plates 113. However, the clutch device 100 may include at least one clutch friction plate 101 and one clutch plate 113, and is not limited to the above-described embodiment.

LIST OF REFERENCE NUMERALS $O_1$ Center of core bar
$O_2$ Center of friction member
OL Line passing through center of core bar and center of friction member
CL Perpendicular line
θ Inclination angle of outer and inner sides of friction member with respect to perpendicular line
LM Elongated friction member
91 Typical clutch friction plate
92 Core bar
93 Friction member
94a Outer side
94b Inner side
94c, 94d Side
95 Oil groove
100 Clutch device
101, 201, 301, 401, 501, 601, 701 Clutch friction plate
102 Core bar
102a Spline tooth
103 Friction member
104a Outer side
104b Inner side
104c, 104d Side
105 Oil groove
110 Housing
111 Input gear
112a Torque damper
112b Rivet
113 Clutch plate
114 Plate holder
114a Receiving body
114b Tubular support column
115 Pressing cover
115a Release bearing
116a Bolt
116b Receiving cap
116c Coil spring
117 Shaft
117a Needle bearing
117b Nut
118 Push rod

The invention claimed is:

1. A clutch friction plate comprising:
multiple friction members having a substantially rectangular shape and arranged along a circumferential direction on a surface of a core bar formed in a flat-plate annular shape; and
oil grooves each formed by a clearance between adjacent ones of the friction members,
wherein each friction member includes
an outer side facing an outer edge portion of the core bar and extending along the outer edge portion, and
an inner side facing an inner edge portion of the core bar and extending parallel to the outer side along the inner edge portion,
the outer side and the inner side are inclined with respect to a perpendicular line perpendicular to a line passing through a center of the each friction member and a center of the core bar,
a width of each of the oil grooves on an outer peripheral side of the core bar is greater than a width of each of the oil grooves on an inner peripheral side of the core bar, each of the width of each of the oil grooves on the outer peripheral side and the width of each of the oil grooves on the inner peripheral side is shorter than a width of each of the friction members as a circumferential length,
the outer side and the inner side are at equal to or greater than 7° and equal to or less than 30° with respect to the perpendicular line,
the friction members are provided on front and back surfaces of the core bar, and
the friction members provided on one of the front and back surfaces are inclined with respect to the perpendicular line in a rotational direction of the clutch friction plate and the friction members provided on another one of the front and back surfaces are inclined with respect to the perpendicular line in a direction opposite to the rotational direction of the clutch friction plate.

2. The clutch friction plate according to claim 1, wherein the outer side and the inner side are formed to extend linearly.

3. The clutch friction plate according to claim 1, wherein each friction member is formed such that a side extending between each end portion of the outer side and each end portion of the inner side extends linearly.

4. A clutch device for transferring rotary drive force of a motor to a driven shaft or blocking the rotary drive force, comprising:
the clutch friction plate according to claim 1; and
a flat-plate annular clutch plate pressed against or separated from the clutch friction plate to transfer or block the rotary drive force.

5. The clutch friction plate according to claim 1, wherein all of the multiple friction members arranged on the surface of the core bar have a same shape and are inclined at a same angle.

6. The clutch friction plate according to claim 1, wherein the clutch friction plate further comprises, at at least one of the outer edge portion or the inner edge portion of the core bar, a region in which none of the friction members is present and into which a clutch oil can flow.

* * * * *